(12) United States Patent
Choi et al.

(10) Patent No.: US 10,315,545 B2
(45) Date of Patent: Jun. 11, 2019

(54) CENTER CONSOLE ARMREST FOR VEHICLE

(71) Applicants: Hyundai Motor Company, Seoul (KR); Kia Motors Corporation, Seoul (KR); DAEJOO PRECISION INDUSTRIAL CO., LTD., Hwaseong-si (KR)

(72) Inventors: Sung Sik Choi, Suwon-si (KR); Hye Kyung Kim, Suwon-si (KR); Young Ju Lee, Suwon-si (KR); Dae Ig Jung, Suwon-si (KR); Hong Sik Chang, Hwaseong-si (KR); Keun Hong Bae, Suwon-si (KR); Ki Young An, Sacheon-si (KR)

(73) Assignees: Hyundai Motor Company, Seoul (KR); Kia Motors Corporation, Seoul (KR); DAEJOO PRECISION INDUSTRIAL CO., LTD., Hwaseong-si (KR)

( * ) Notice: Subject to any disclaimer, the term of this patent is extended or adjusted under 35 U.S.C. 154(b) by 0 days.

(21) Appl. No.: 15/798,225

(22) Filed: Oct. 30, 2017

(65) Prior Publication Data

US 2018/0178687 A1 Jun. 28, 2018

(30) Foreign Application Priority Data

Dec. 22, 2016 (KR) .......................... 10-2016-0176417

(51) Int. Cl.
*B60R 7/04* (2006.01)
*B60N 2/75* (2018.01)

(52) U.S. Cl.
CPC .............. *B60N 2/767* (2018.02); *B60N 2/793* (2018.02); *B60R 7/04* (2013.01)

(58) Field of Classification Search
CPC ........ B60N 2/767; B60N 2/753; B60N 2/793; B60R 7/04
(Continued)

(56) References Cited

U.S. PATENT DOCUMENTS 10,040,397 B1 * 8/2018 Wuerthele ................. B60R 7/04
2008/0035657 A1 * 2/2008 Yamashita ................ B60R 7/04
220/826
(Continued)

FOREIGN PATENT DOCUMENTS

KR 10-2004-0021034 A 3/2004

*Primary Examiner* — Jason S Morrow
(74) *Attorney, Agent, or Firm* — Morgan, Lewis & Bockius LLP

(57) ABSTRACT

A center console armrest is provided for preventing an armrest from being interfered with an external wall of a center console when the armrest is opened by forming a proximal end portion of the armrest that can be further rotated and inserted into the internal to the console when the armrest is opened, may include an armrest configured to be opened on an upper portion of the center console; a lead portion rotatable about a main hinge disposed inside the center console to cause the armrest to be opened; an armrest hinge configured to connect the lead portion and the armrest; a lower end portion protrusion disposed inside a proximal end portion of the armrest to be inserted into the center console; and a guide rail for guiding movement of the lower end portion protrusion.

12 Claims, 7 Drawing Sheets

(58) Field of Classification Search
USPC .............................................. 296/24.34, 1.09
See application file for complete search history.

(56) References Cited

U.S. PATENT DOCUMENTS

| | | | | |
|---|---|---|---|---|
| 2016/0339847 A1* | 11/2016 | Kodama | .................... | B60R 7/04 |
| 2017/0267183 A1* | 9/2017 | Catlin | ........................ | B60R 7/04 |
| 2018/0236909 A1* | 8/2018 | Choi | ........................ | B60N 2/767 |
| 2018/0236917 A1* | 8/2018 | Kim | ........................ | B60N 2/753 |

* cited by examiner

CENTER CONSOLE ARMREST FOR VEHICLE

CROSS-REFERENCE(S) TO RELATED APPLICATION

The present application claims priority to Korean Patent Application No. 10-2016-0176417 filed on Dec. 22, 2016, the entire contents of which is incorporated herein for all purposes by this reference.

BACKGROUND OF THE INVENTION

Field of the Invention

The present invention relates to a center console arm rest. More specifically, the present invention relates to a center console arm rest for preventing the armrest from being interfered with the external wall of the console and minimizing radius of rotation of the armrest when the armrest is opened, wherein in view of a left and right open type armrest wherein when armrests are opened, each armrest is rotated with respect to a lead portion and is further rotated such that a proximal end portion of the arm rest, which is connected to the lead portion, moves into the internal to the center console.

Description of Related Art

Generally, a console box for temporary storage of goods is provided between a driver seat and a passenger seat. The console box is provided on its upper portion with an armrest that not only serves as a lid but also allows an arm of an occupant on a seat in a vehicle to rest thereon comfortably.

The armrest is an important thing in that a driver who drives a vehicle over long distances can do shift gears, etc. while his or her arm is rested on the armrest, reducing fatigue of the driver.

Such an armrest includes a simple type armrest which has a console formed therein and covers only a portion of a shift lever or a parking brake lever provided in a tunnel portion of a floor panel between the driver seat and the passenger seat; and a large type armrest which forms a portion of an instrument panel in which switches, a radio set, a stereo audio device, a heater control, storage bags for small items, etc. are disposed and which is provided on the back side thereof with a box portion having a lid to which a pad is attached and further an ashtray or some switches for a rear seat.

In recent years, an open type armrest has been being provided to promote using consoles of various uses and hence researches have been being conducted to utilize a console space inside the opened armrest as a loading space.

FIG. 1 represents a left and right open type center console and includes armrests 10 to be opened to the left and right sides respectively through a fixing hinge 12.

As disclosed, the armrests 10 are configured to be connected to the console via the fixing hinges 12 disposed at the left and right sides. An internal space of the console is opened through rotation of the armrests 10.

However, as described above, in the case where the position of the fixing hinge of the armrest 10 is positioned above the storage space of the console, there is a problem in that height of the armrest 10 at the time when the armrest is opened becomes excessively high and hence it is difficult to access to the storage space. On the other hand, in the case where the position of the fixing hinge of the armrest is disposed below the storage space, there are problems in that although access to the storage space is facilitated at the time when the armrest is opened, a space for allowing rotation of the armrest 10 is insufficient and the armrest is interfered with an external wall 11 of the console when the armrest 10 rotates.

Furthermore, since the height of the console is limited to maintain an upper space for allowing rotation of the armrest, there is a limit to expand the storage space.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present invention are directed to providing a center console for preventing an armrest from being interfered with an external wall of the center console when the armrest is opened by forming a proximal end portion of the armrest that can be further rotated and inserted into the internal to the console when the armrest is opened.

Another aspect of the present invention is configured to provide a structure of opening an armrest that minimizes degree of protrusion of the armrest as well as radius of rotation of the armrest at the time when the armrest is opened, facilitating access to the internal of the center console.

The present invention is not limited to the afore-mentioned description and other aspects of the present invention, which are not mentioned herein, can be understood by reading the following description and can be more clearly understood by embodiments of the present invention. Further, the objects of the present invention can be realized by the device represented in the appended claims and combinations thereof.

In one aspect of the present invention, there is provided a center console armrest for a vehicle including: an armrest configured to be opened on an upper portion of the center console; a lead portion configured to rotate about a main hinge disposed inside the center console to cause the armrest to be opened; and an armrest hinge configured to connect the lead portion and the armrest, wherein when the center console is opened, the lead portion is configured to allow the armrest to rotate about the main hinge and the armrest is configured to rotate about the armrest hinge in the same direction of rotating about the main hinge by taking the armrest hinge as a central axis.

Further, the center console armrest further includes a lower end portion protrusion disposed inside a proximal end portion of the armrest to be inserted into the internal to the center console; and a guide rail for guiding movement of the lower end portion protrusion, wherein the lower end portion protrusion is configured to move into the internal to the center console along the guide rail such that the proximal end portion of the armrest moves into the internal to the center console.

Further, the guide rail is configured to prevent the armrest from being interfered with an external wall of the center console when the armrest rotates.

Further, the main hinge is configured to allow the armrest to be fixed by a fixing portion disposed inside the center console when the armrest is closed.

Further, the center console armrest further includes an elastic member disposed at the main hinge to provide rotational force to the lead portion.

Further, the external wall of the center console is configured to allow the armrest to move toward the outside of the center console when the armrest is opened.

Further, moving direction of the lower end portion protrusion formed in the guide rail has an angle greater than a predetermined angle with respect to a connection line connecting the lower end portion protrusion to the central axis of the main hinge.

Further, moving direction of the lower end portion protrusion formed in the guide rail has an angle greater than 30 degrees with respect to a connection line connecting the lower end portion protrusion to the central axis of the main hinge.

Further, a bottom face of the arm rest includes a sliding guide wherein the sliding guide is configured to allow the armrest to move in a longitudinal direction thereof.

Further, the armrest is configured to be opened in both left and right directions.

Further, the armrest hinge is configured to allow free rotation between the lead portion and the armrest.

Further, the main hinge and the armrest hinge maintain a distance therebetween when the armrest is opened.

Further, the armrest hinge and the lower end portion protrusion of the armrest maintain a distance therebetween when the armrest is opened.

According to an exemplary embodiment of the present invention, the following effects can be achieved by a combination and use relationship of the foregoing embodiments and configurations described below.

The present invention has an effect of providing a wider storage space inside the center console by reducing radius of rotation of the armrest when the armrest is opened to reduce an interference portion which may be interfered with the external wall of the center console.

Furthermore, the present invention has an effect of allowing the user to easily access to the storage space by reducing the degree of protrusion of the armrest at the time when the armrest is rotated.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for exemplary embodiment both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

Figure 1:
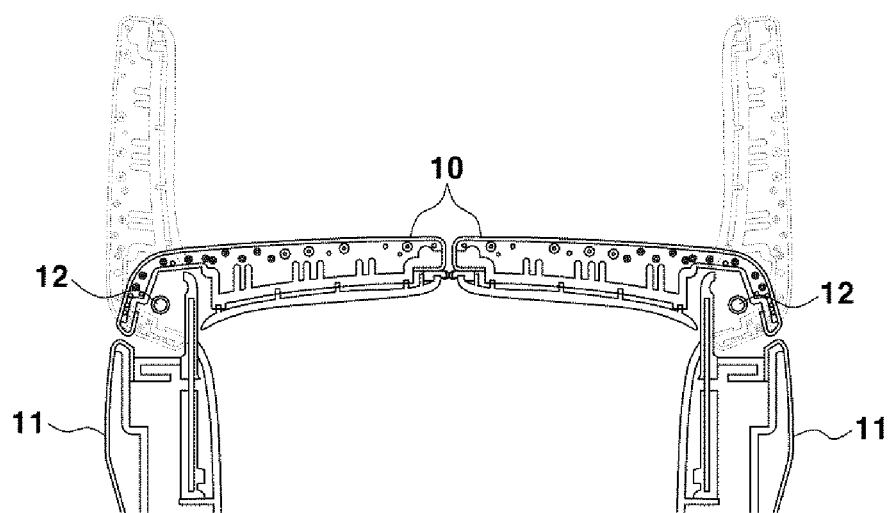
FIG. 1 shows a cross section view of a left and right open type center console armrest in the related art.

It may be understood that the appended drawings are not necessarily to scale, presenting a somewhat simplified representation of various exemplary features illustrative of the basic principles of the invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, the term "portion" herein is directed to mean a device for performing at least one function or operation.

Various aspects of the present invention are directed to providing an openable center console armrest 100 and preferably includes a technique directing to a double door type or a single door type openable armrest 110. There is provided a technique for maximizing a storage space 210 inside a center console 200 by reducing radius of rotation of the armrest at the time when the armrest 110 is opened to reduce an interference portion.

Figure 2:
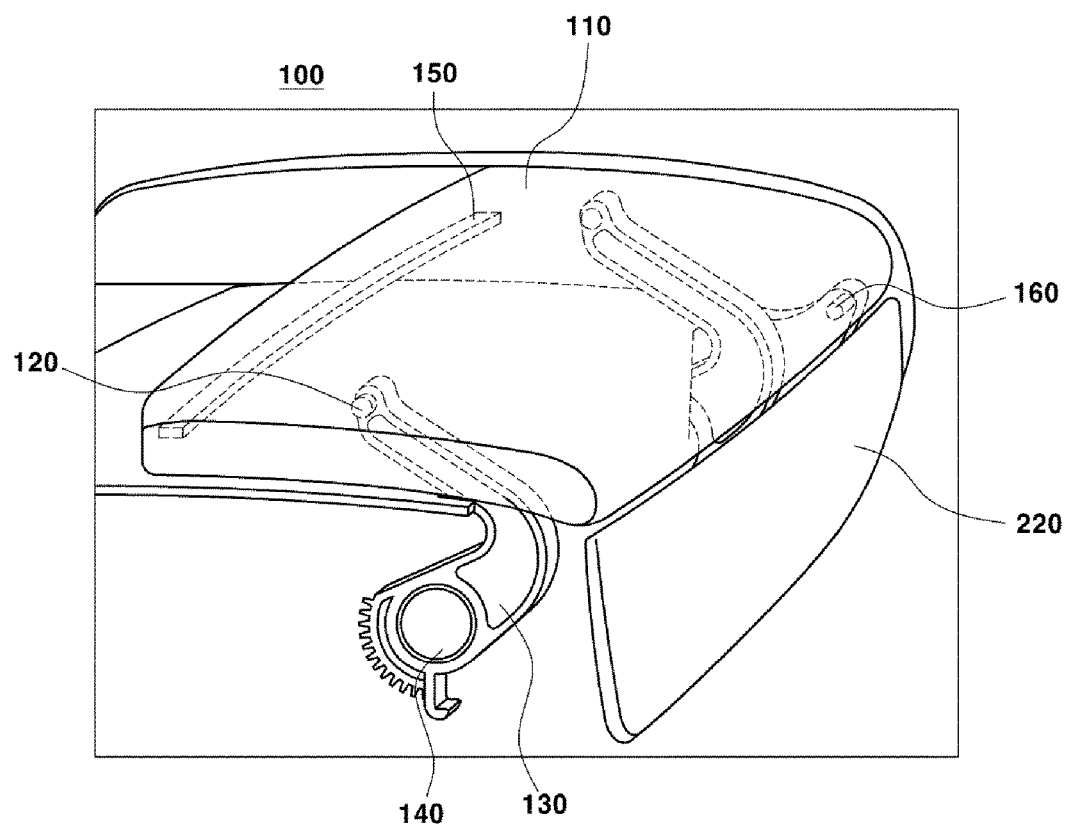
FIG. 2 shows a perspective view of a center console armrest for a vehicle according to an exemplary embodiment of the present invention.

FIG. 2 shows a perspective view of a center console armrest 100 for a vehicle according to an exemplary embodiment of the present invention.

As shown, the center console armrest 100 for a vehicle according to an exemplary embodiment of the present invention includes a center console 200 including a storage space 210, an armrest 110 positioned on a top plane of the center console 200 and configured to be opened in one direction or both directions, and a lead portion 130 configured to rotate to cause the armrest 110 to be opened.

The lead portion 130 is positioned to be perpendicular to a longitudinal direction of the armrest 110 and at least one lead portion is disposed. Where the armrest 110 is of a type which is opened as like a double door type, the lead portion has a symmetrical shape.

The armrest 110 of the present invention may include a sliding guide 120 at a lower end portion thereof. The sliding guide may be configured to move in a height direction when the armrest 110 rotates.

The lead portion 130 of the present invention is positioned to be connected to the main hinge 140 which is a central axis for rotation, while the main hinge 140 is configured to be positioned inside the center console 200.

Further, the lead portion includes an armrest hinge 150 which connects a distal end portion of the lead portion 130 and the armrest 110 wherein the armrest hinge 150 may be configured to allow free rotation between the lead portion 130 and the armrest 110.

As mentioned above, since the armrest hinge 150 allows free movement between the lead portion 130 and the armrest 110, it may be configured such that radii of rotation of both end portions of the armrest 110 are different depending on movement of the lead portion 130 connected to an internal middle portion of the armrest 110.

In a case of a double door type armrest 110 of the present invention, as the radius of rotation of the armrest 110 for opening the center console 200 depends on the position of the armrest hinge 150, the armrest 110 to be opened has a wide radius of rotation when the armrest hinge 150 has moved to a widthwise end portion of the armrest 110.

On the other hand, as the position of the armrest hinge 150 approaches an end portion that brings the armrest 110 to be opened, the radius of rotation of the armrest 110 to be opened becomes smaller.

That is, it may be configured such that when the lead portion 130 rotates, an end portion of the armrest 110 inserted into the center console 200 rotate simultaneously with respect to the armrest hinge 150 so that the radius of rotation of the armrest 110 becomes smaller.

Further, in an exemplary embodiment of the present invention, it is configured to include an elastic member 300 connected to the main hinge 140 wherein the elastic member 300 is formed to provide a certain amount of rotational force to the lead portion 130 connected to the armrest 110 so that rotation of the armrest 110 is effected when the armrest 110 is disengaged from a fixing portion 180.

The armrest 110 of the present invention is configured to be opened by the rotation of the lead portion 130 wherein the lead portion 130 rotates about the main hinge 140.

Further, when the armrest 110 is rotated by the lead portion 130, a lower end portion protrusion 160 located inside the end portion of the armrest 110 inserted into the center console 200 is configured to move along a guide rail 170 positioned inside the center console 200.

The lower protrusion 160 is configured to move the end portion of the armrest 110 into the internal to the center console 200 about the armrest hinge 150 at the same time as the lead portion 130 rotates.

In addition, the guide rail 170 is configured to enable the armrest 110 of the present invention to move into the internal to the center console 200 as the armrest moves further toward a lower direction so that the lower end portion protrusion 160 moving along the guide rail 170 when the armrest 110 is opened moves into the internal to the center console 200 according to movement of the guide rail 170.

Therefore, when the armrest 110 is being opened, the lower end portion protrusion 160 moves into the internal to the center console 200 along the guide rail 170 and the end portion of the armrest 110 where the lower end portion protrusion 160 is located pivots about the armrest hinge 150 and moves into the internal to the center console 200.

The guide rails 170 may be set such that the armrest 110 rotates through rotation of the main hinge 140 and at the same time the lower end portion protrusion 160 located inside the end portion of the armrest 110 is moved about the armrest hinge 150, so that the end portion of the armrest 110 is inserted within the center console 200 without interfere with an external wall 220 of the center console 200.

That is, as the distance between the main hinge 140 and the armrest hinge 150 is kept constant and the distance between the armrest hinge 150 and the lower end portion protrusion 160 is kept constant when the armrest 110 is opened, the lower end portion protrusion 160 moving along the guide rail 170 enters the internal to the center console 200 so that the radius of rotation of the end portion of the armrest 110 is reduced.

Further, as the armrest hinge 150 is configured to allow degree of freedom of rotation between the lead portion 130 and the armrest 110, the end portion of the armrest 110 is further rotated about the armrest hinge 150 when the armrest 110 is rotated by the lead portion 130 so that an angle formed between the lead portion 130 and an extension line between the arm rest hinge 150 and the lower end portion protrusion 160 becomes smaller as the armrest further rotates.

That is, the armrest hinge 150 which exists at a position where the armrest 110 and the lead portion 130 are connected to each other is configured to allow the end portion of the armrest 110 to be rotated and at the same time folded toward the internal to the center console 200 when the armrest 110 is opened. As mentioned above, the armrest hinge 150 is configured to allow the main hinge 140 to rotate about its central axis and at the same time allow the end portion of the armrest 110 which is pivoted about the armrest hinge 150 and inserted into the internal to the center console 200 to further rotate in the same direction such that the end portion of the armrest 110 is folded toward the internal to the center console 200.

Accordingly, when the armrest 110 is opened by being rotated about the main hinge 140 and the armrest hinge 150, the armrest 110 is not interfered with the external wall 220 of the center console 200.

Moreover, when the armrest 110 is rotated to open the armrest 110, the external wall 220 of the center console 200 is configured to move in an outward direction thereof. the present configuration is to prevent the external wall from interfering with the armrest 110 inserted into the internal to the center console 200.

The external wall 220 may be configured to be fastened to a fixing portion 180. In the instant case, the external wall 220 is configured to move toward the outside of the center console 200 when engagement with the fixing portion 180 is released to open the armrest 110.

With the fixing portion 180 connected to one end portion of the lead portion 130, which is connected to the main hinge 140, when the center console armrest 100 is kept closed, it is possible to maintain the closed state of the armrest 110.

The fixing portion 180 can be released by pressing a button disposed on the armrest 110 or pressing the armrest 110 and adopt a common fastening manner.

Figure 3:
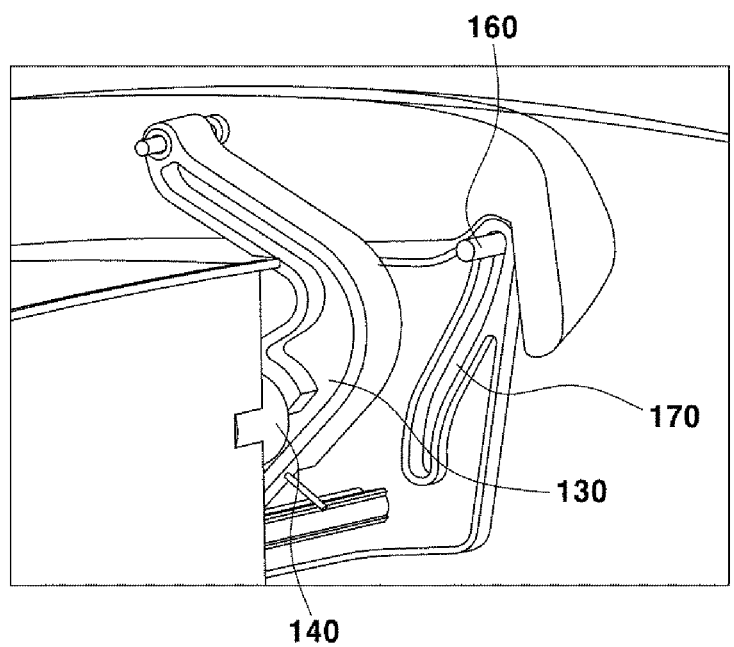
FIG. 3 is a view illustrating coupling of a guide rail and a lower end portion protrusion of a center console armrest for a vehicle according to an exemplary embodiment of the present invention.

FIG. 3 illustrates the relation of coupling between the lower end portion protrusion 160 positioned at the internal end portion of the armrest 110 and the guide rail 170 in accordance with an exemplary embodiment of the present invention.

The lower end portion protrusion 160 of the armrest 110 is configured to be disposed at the internal end portion of the armrest 110. Therefore, in a case of a double door opening type armrest 110, the lower end portion protrusion is provided at an end portion of each armrest 110. Further, as the lower end portion protrusion 160 is configured to move along the guide rail 170, it moves along the guide rail 170 having a predetermined curvature toward the internal to the center console 200 when the armrest 110 is opened.

Further, as the end portion of the armrest 110, which is connected to the lower end portion protrusion 160, is configured to move into the internal to the center console 200, the area of the armrest 110 between the lower end portion protrusion 160 and the armrest hinge 150 has a radius of rotation smaller than that of the lead portion 130.

Figure 4:
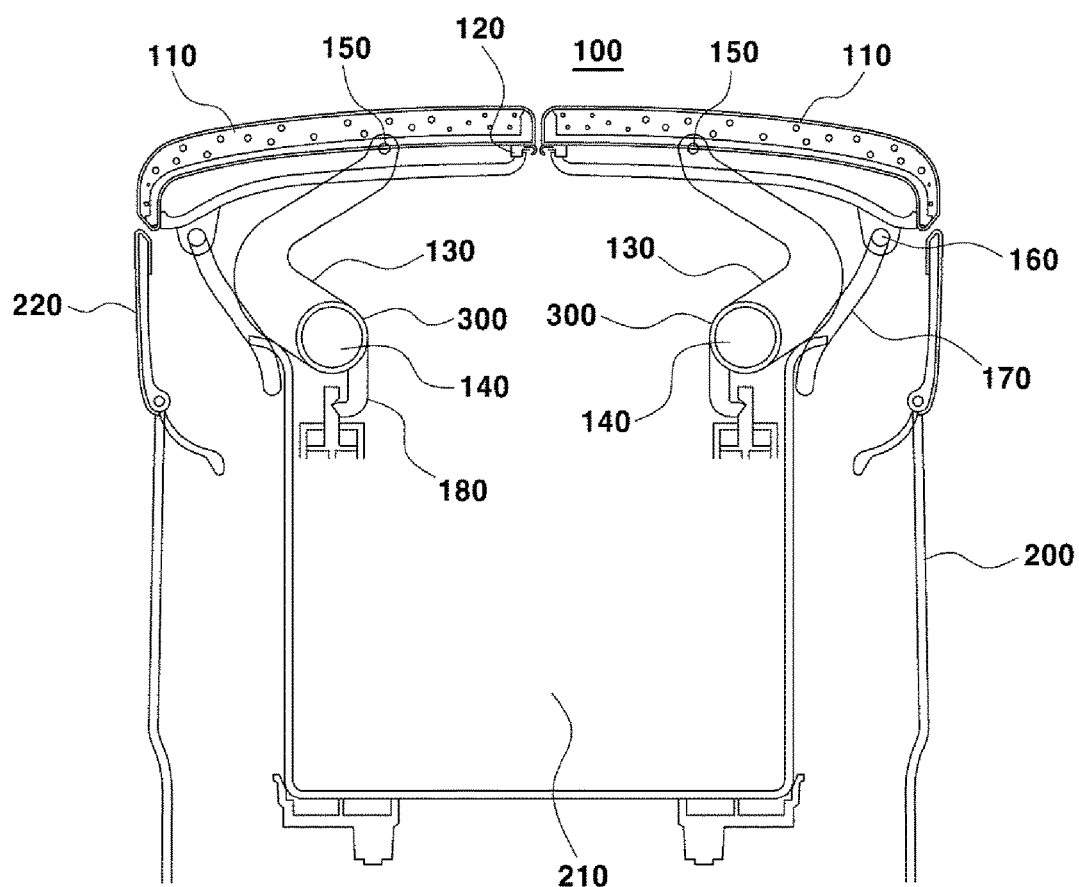
FIG. 4 shows a cross section view of a center console armrest for a vehicle according to an exemplary embodiment of the present invention.

FIG. 4 shows a cross section view of a center console armrest 100 for a vehicle according to an exemplary embodiment of the present invention.

In the present exemplary embodiment in which the armrest 110 is of a double door opening type, the center console armrest includes armrests 110 to be opened toward the left and right sides respectively wherein each armrest is configured to be connected to the lead portion 130 connected to the main hinge 140 through a widthwise middle portion of the armrest 110 itself.

Further, as the internal side of the end portion of each armrest 110 is provided with the lower end portion protrusion 160, the lower end portion protrusion 160 is configured to move along the guide rail 170 disposed inside the center console 200 when the armrest 110 is opened.

The present exemplary embodiment shows the fixing portion 180 configured to be connected to one end portion of the lead portion 130, which is connected to the main hinge 140, wherein the fixing portion 180 is configured to provide clamping force to maintain the armrest 110 in a closed state.

The fixing portion 180 is configured to be released from a fastened state when the armrest 110 is opened wherein opening the armrest 110 makes the storage space 210 positioned inside the center console 200 open.

Further, the present exemplary embodiment shows an elastic member 300 positioned at the main hinge 140 wherein when fastening with the fixing portion 180 is released, the elastic member 300 is configured to exert a certain amount of rotational force to the lead portion 130 to cause the lead portion 130 to rotate such that the armrest 110 connected to an upper portion of the lead portion 130 is opened.

The lower end portion protrusion 160 is configured to move into the internal to the center console 200 along the guide rail 170 when each armrest 110 is opened wherein it is configured such that radius of rotation of the area between the armrest hinge 150 and the lower end portion protrusion 160 is smaller than that of each of the main hinge 140 and the armrest hinge 150.

A portion of the external wall 220, which is positioned at a portion of the upper end portion of the center console 200, is configured to be flared toward the outside of the center console 200 such that the end portion of the armrest 110 that performs rotation is not interfered with the external wall when the armrest 110 is opened.

FIG. 5A, FIG. 5B, FIG. 5C, and FIG. 5D sequentially illustrate operation for opening the armrest 110 according to an exemplary embodiment of the present invention.

Figure 5A:
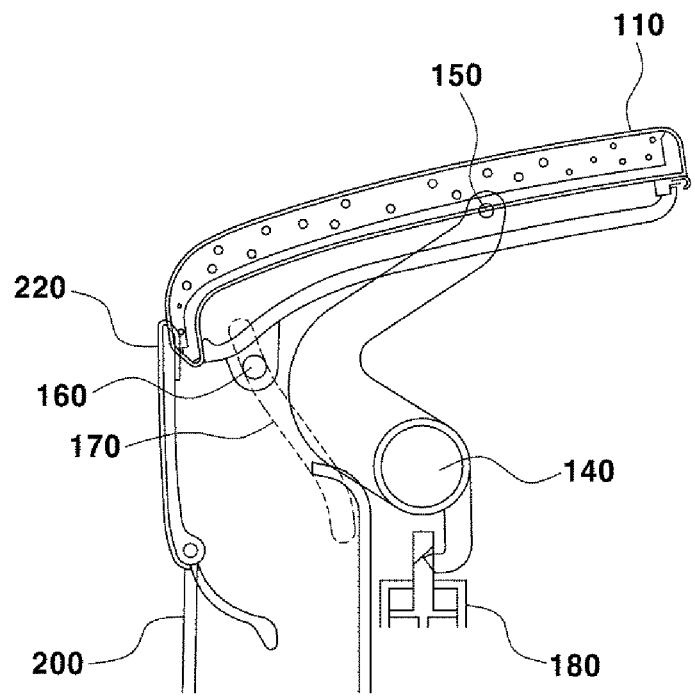
FIG. 5A shows an operational view of a center console armrest for a vehicle according to an exemplary embodiment of the present invention when the armrest is in a closed state.

FIG. 5A shows a cross section view of the center console armrest 100 of the present invention when it is in a closed state, in which the lead portion 130 is fixed through the fixing portion 180 disposed at one end portion of the lead portion 130.

Figure 5B:
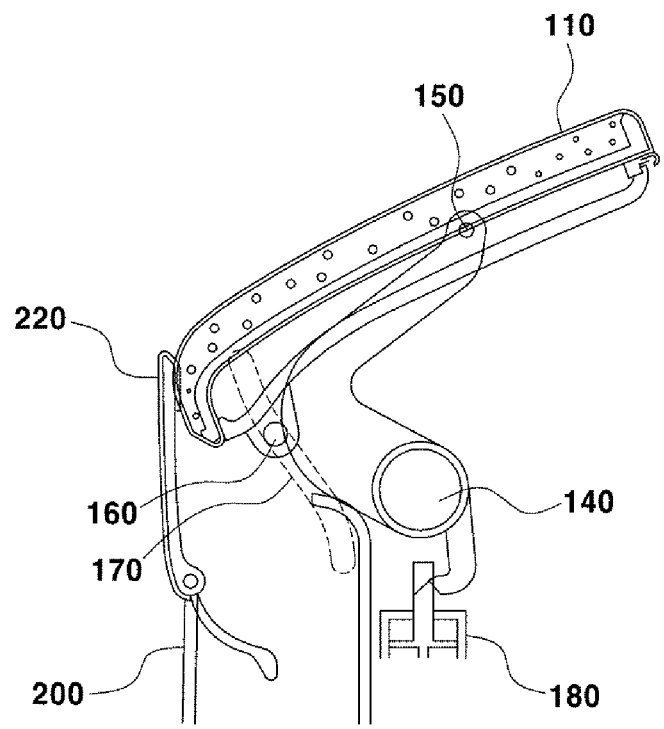
FIG. 5B shows an operational view of a center console armrest for a vehicle according to an exemplary embodiment of the present invention when the armrest is initiated to open.

FIG. 5B shows a state after the fixed state with the fixing portion 180 is released wherein one end portion ("proximal end portion") of the armrest 110 where the lower end portion protrusion 160 is disposed is inserted into the center console 200 and the other end portion ("distal end portion") of the armrest 110 is lifted.

In the instant case, the lower end portion protrusion 160 moves into the internal to the center console 200 along the guide rail 170 such that distance between the lower end portion protrusion 160 and the main hinge 140 becomes closer.

That is, the armrest 110 is rotated through the lead portion 130 while the lower end portion protrusion 160 moves along the guide rail 170 with respect to the arm rest hinge 150 so that the armrest 110 further moves about the armrest hinge 150.

Figure 5C:
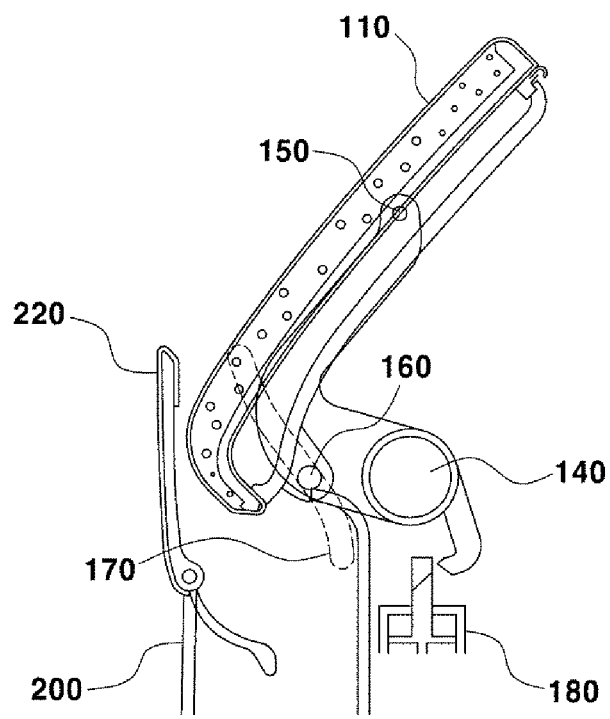
FIG. 5C shows an operational view of a center console armrest for a vehicle according to an exemplary embodiment of the present invention when the armrest is being opened.

FIG. 5C show a state that the distal end portion of the armrest 110 continues to be lifted, in which the lower end portion protrusion 160 moves into the internal to the center console 200 while the proximal end portion of the armrest 110 descends along the external wall 220 of the center console 200.

That is, the figure shows a state that the armrest 110 is inserted into the internal to the external wall 220 of the center console 200, wherein the armrest 110 further rotates about the armrest hinge 150 while the lower end portion protrusion 160 moves along the guide rail 170 to guide movement of the proximal end portion of the armrest 110.

Figure 5D:
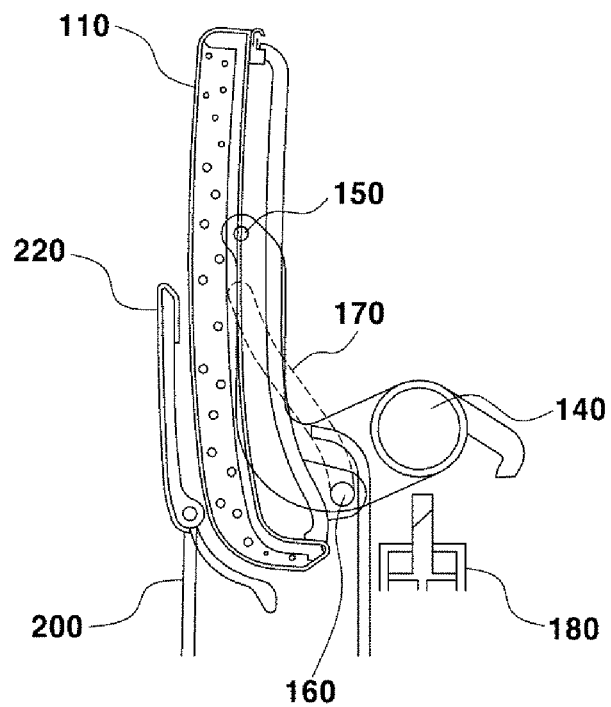
FIG. 5D shows an operational view of a center console armrest for a vehicle according to an exemplary embodiment of the present invention when the armrest is fully opened.

FIG. 5D shows a state that the armrest 110 is fully opened wherein an angle between an extension line between the main hinge 140 and the armrest hinge 150 and an extension line between the armrest hinge 150 and the lower end portion protrusion 160 is in a minimized state.

Figure 6:
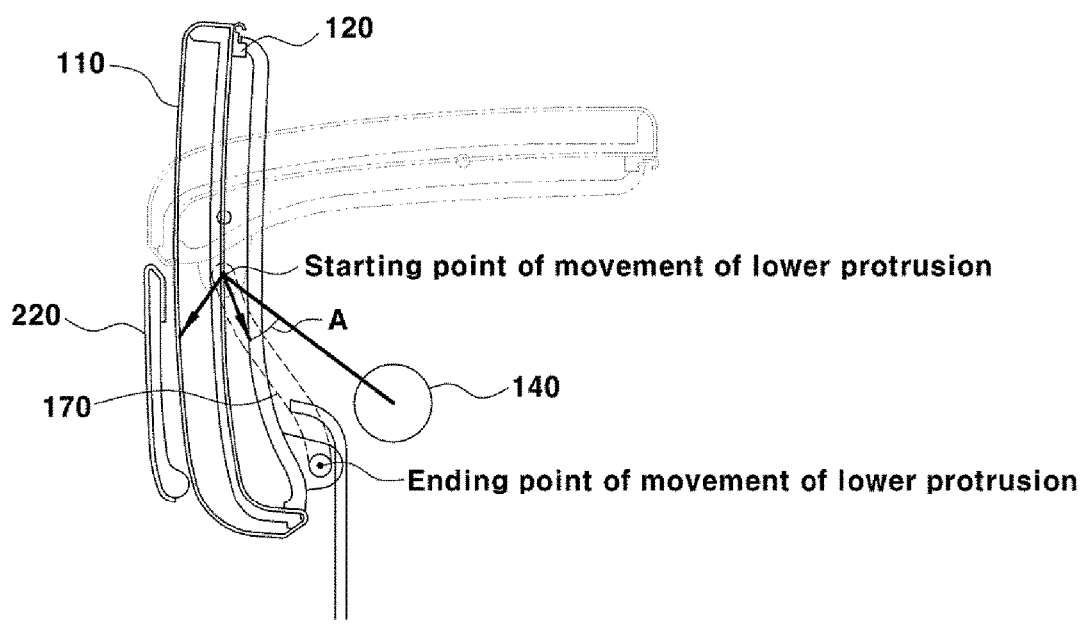
FIG. 6 is a view illustrating rotational operation of a center console armrest for a vehicle according to an exemplary embodiment of the present invention.

FIG. 6 is a view for illustrating rotational operation of the center console armrest 100 of the present invention in a superimposed manner.

In a case of an exemplary embodiment in which the armrest 110 is of a double door opening type, one end portion of the armrest 110 located at the center of the center console 200 can be moved to rotate. In the instant case, the armrest 110 is configured to move into the upper space when the center console 200 is opened.

In the present manner, as the armrest 110 of the present invention is connected to the main hinge 140 and includes the lead portion 130 connected to the armrest hinge 150 disposed in the widthwise central area of the armrest 110, the armrest 110 is rotated by rotational force of the lead portion 130 to open the center console 200.

Further, it is configured to include the lower end portion protrusion 160 disposed inside the proximal end portion of the armrest 110, which is inserted into the center console 200 when the armrest 110 is opened, wherein the lower end portion protrusion 160 is inserted into the guide rail 170 to guide moving direction of the proximal end portion of the armrest 110.

Moreover, the lower end portion protrusion 160 moving along the guide rail 170 is configured to be positioned at an end portion of the guide rail 170, which is located at the uppermost position, when the armrest 110 is closed, wherein the lower end portion protrusion starts to move along the guide rail 170 when the armrest 110 is initiated to open.

Further, the lower end portion protrusion 160 is configured to move with respect the armrest hinge 150 of the center console 200 so that the armrest 110 rotates simultaneously with respect to the armrest hinge 150.

The guide rail 170 in the exemplary embodiment of the present invention is configured to set moving direction of the lower end portion protrusion 160 wherein an angle between the guide rail and a connection line connecting central the lower end portion protuberance 160 to the central axis of the main hinge 140 is set to be greater than a predetermined angle.

That is, such configuration of the present invention that the guide rail 170 is formed to have an angle greater than the predetermined angle with respect the connection line is directed to prevent movement of the lower end portion protrusion 160 along the path of the guide rail 160 from being interfered when the armrest 110 further rotates about the armrest hinge 150.

The lower end portion protrusion 160 is configured to be positioned in the guide rail 170 such that direction in which the lower end portion protrusion 160 moves along the guide rail 170 forms an angle A with the extension line connecting the main hinge 140 and the lower end portion protrusion 160. More The angle A may be greater than 30 degrees.

Accordingly, the lower end portion protrusion 160 smoothly moves along the guide rail 170 while the armrest 110 rotates.

As mentioned above, since the lower end portion protrusion 160 disposed inside the proximal end portion of the armrest 110 moves along the guide rail 170, the guide rail 170 allows the lower end portion protrusion 160 to move with respect to the armrest hinge 150 that rotates depending on rotation of the main hinge 140 without any interference.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A center console armrest apparatus for a vehicle comprising:
   an armrest configured to be opened on an upper portion of a center console;
   a lead portion rotatable about a main hinge disposed inside the center console to cause the armrest to be opened;
   an armrest hinge connecting the lead portion and the armrest;
   a lower end portion protrusion disposed inside a proximal end portion of the armrest to be inserted into an internal to the center console; and
   a guide rail for guiding a movement of the lower end portion protrusion,
   wherein, when the center console is opened, the lead portion is configured to allow the armrest to rotate about the main hinge and the armrest is rotatable about the armrest hinge in a same direction of rotating about the main hinge by taking the armrest hinge as a central axis, and
   wherein the lower end portion protrusion is configured to move into the internal to the center console along the guide rail, and the proximal end portion of the armrest moves into the internal to the center console.

2. The center console armrest apparatus of claim 1, wherein the guide rail is configured to prevent the armrest from being interfered with an external wall of the center console when the armrest rotates.

3. The center console armrest apparatus of claim 1, wherein the main hinge is configured to allow the armrest to be fixed by a fixing portion disposed inside the center console when the armrest is closed.

4. The center console armrest apparatus of claim 1, further including an elastic member disposed at the main hinge to provide a rotational force to the lead portion.

5. The center console armrest apparatus of claim 1, wherein the external wall of the center console is configured to allow the armrest to move toward an outside of the center console when the armrest is opened.

6. The center console armrest apparatus of claim 1, wherein a moving direction of the lower end portion protrusion formed in the guide rail has an angle greater than a predetermined angle with respect to a connection line connecting the lower end portion protrusion to the central axis of the main hinge.

7. The center console armrest apparatus of claim 6, wherein the moving direction of the lower end portion protrusion formed in the guide rail has an angle greater than degrees with respect to the connection line connecting the lower end portion protrusion to the central axis of the main hinge.

8. The center console armrest apparatus of claim 1, wherein a bottom face of the arm rest includes a sliding guide and wherein the sliding guide is configured to allow the armrest to move in a longitudinal direction thereof.

9. The center console armrest apparatus of claim 1, wherein the armrest is configured to be opened in both first and second directions thereof.

10. The center console armrest apparatus of claim 1, wherein the armrest hinge is configured to allow a free rotation between the lead portion and the armrest.

11. The center console armrest apparatus of claim 1, wherein the main hinge and the armrest hinge maintain a predetermined distance therebetween when the armrest opened.

12. The center console armrest apparatus of claim 1, wherein the armrest hinge and the lower end portion protrusion of the armrest maintain a predetermined distance therebetween when the armrest is opened.

\* \* \* \* \*